United States Patent [19]

Seeman et al.

[11] Patent Number: 5,399,971

[45] Date of Patent: * Mar. 21, 1995

[54] METHOD AND APPARATUS FOR EVALUATING FORMATION RESISTIVITY USING FOCUSED ANNULAR AND AZIMUTHAL ELECTRODES

[75] Inventors: Bronislaw Seeman, Paris; Jean-Claude Trouiller, Saint Rémy les Chevreuse, both of France

[73] Assignee: Schlumberger Technology Corporation, New York, N.Y.

[ * ] Notice: The portion of the term of this patent subsequent to Mar. 7, 2012 has been disclaimed.

[21] Appl. No.: 974,029

[22] Filed: Nov. 10, 1992

[30] Foreign Application Priority Data

Nov. 28, 1991 [FR] France ................. 91 14701

[51] Int. Cl.⁶ ............................................... G01V 3/20
[52] U.S. Cl. ................................................ 324/373
[58] Field of Search ............... 324/363, 366, 367, 354, 324/355, 373–375

[56] References Cited

U.S. PATENT DOCUMENTS

| | | | |
|---|---|---|---|
| 3,065,405 | 11/1962 | Jarrett | 324/373 |
| 3,388,325 | 6/1968 | Birdwell et al. | 324/373 |
| 3,493,849 | 3/1970 | Doll | 324/373 |
| 3,772,589 | 11/1993 | Scholberg . | |
| 4,286,217 | 8/1981 | Planche et al. | 324/373 X |

FOREIGN PATENT DOCUMENTS

| | | |
|---|---|---|
| 941014 | 1/1974 | Canada . |
| 2611920 | 9/1988 | France . |
| 928583 | 6/1963 | United Kingdom . |
| 2194345 | 3/1988 | United Kingdom . |

*Primary Examiner*—Gerard R. Strecker
*Assistant Examiner*—Warren S. Edmonds
*Attorney, Agent, or Firm*—Leonard W. Pojunas

[57] ABSTRACT

The apparatus includes an array of azimuthal current electrodes ($Aaz_i$) that are circumferentially spaced apart from one another on a body together with two annular guard electrodes (A2) disposed on opposite sides of the array of azimuthal current electrodes ($Aaz_i$). Measurement currents ($Iaz_i$) are emitted by the current electrodes ($Aaz_i$) and focusing currents are emitted by the guard electrodes (A2). Azimuthal monitor electrodes ($Maz_i$) are associated with respective ones of the azimuthal current electrodes ($Aaz_i$). Two annular monitor electrodes (M3, M4) are disposed on opposite sides of the array of azimuthal current electrodes ($Aaz_i$). For focusing purposes, a servo-control system controls the emission of the currents so as to substantially cancel the potential difference detected between the short circuited monitor electrodes (M3, M4) and each of the azimuthal monitor electrodes ($Maz_i$). In response to the measurement currents ($Iaz_i$), output signals ($Raz_i$) are generated representative of the resistivity of the formations in a plurality of directions around the axis of the borehole. A high resolution output signal (Rhr) is also generated as a function of the sum of the measurement currents ($Iaz_i$).

14 Claims, 3 Drawing Sheets

METHOD AND APPARATUS FOR EVALUATING FORMATION RESISTIVITY USING FOCUSED ANNULAR AND AZIMUTHAL ELECTRODES

BACKGROUND OF THE INVENTION

The invention relates to well logging for evaluating the resistivity of earth formations through which a borehole passes, and more particularly to an electrical logging method and apparatus using electrodes.

A well logging device with electrodes that has been commercially available for many years and that is known under the name "Dual Laterolog" is described in U.S. Pat. No. 3,772,589 (Scholberg). That device comprises an array of annular electrodes used for sending electrical measurement currents into the formations for the purpose of measuring their resistivity. The measurement currents are focused in an annular zone having the form of a disk perpendicular to the borehole axis by means of auxiliary currents emitted by guard electrodes. That device includes measuring deep resistivity of the earth formations (LLd mode) and measuring shallower resistivity of the earth formations (LLs mode) by emitting currents at different frequencies, typically 35 Hz and 280 Hz.

A drawback of that device is that its longitudinal resolution (i.e. in the longitudinal direction of the borehole) is poor, being about one meter. In addition, in some cases and in particular in boreholes that are deviated or horizontal, the annular zone scanned by the device around the borehole comprises different layers of earth formation and gives an average measurement that has little meaning. It is therefore desirable to obtain resistivity measurements in a plurality of azimuthal directions around the borehole.

Logging apparatuses are known that detect the resistivity of formations in a plurality of azimuthal directions around the axis of the borehole. Those devices seek to obtain information about fractures or about the dip of formations. For example, British patent 928 583 (British Petroleum Company Limited) describes an array of azimuthal measurement electrodes distributed circumferentially around the periphery of a logging sonde. A guard electrode which surrounds the measurement electrodes enables an auxiliary current to be emitted for focusing the currents emitted by each of the measurement electrodes.

In such a sonde, measurement current focusing is passive, and this focusing is obtained by emitting the various currents via electrodes that are short-circuited together. Unfortunately, focusing must be particularly effective since the measurement electrodes are disposed on the body of the sonde and thus may be spaced-apart long distances, up to about 10 cm, from the wall of the borehole, such spacing distances being possibly different in different directions when the sonde is not centered in the borehole. A defect of this passive focusing technique is the often inadequate quality of its focusing.

French patent FR 2 611 920 (CNRS) describes a logging sonde in which correction means are proposed acting on the potential of the current electrodes in order to improve focusing. The sonde includes monitor electrodes disposed at a certain distance ahead of the current electrodes and circuits that are responsive to the potentials detected by said monitor electrodes to control the measurement currents. It is difficult and complicated to make such a sonde, which requires concentric rings of electrodes.

SUMMARY OF THE INVENTION

An primary object of the invention is to provide a logging technique for obtaining accurate azimuthal resistivity measurements in order to detect fractures or other peripheral variations of resistivity in a borehole.

Another object of the invention is to provide a logging technique using azimuthal electrodes enabling effective focusing of the measurement currents to be obtained both longitudinally and circumferentially.

Still another object of the invention is to provide a focused logging technique that provides measurement of resistivity having high longitudinal resolution.

In a first aspect of the invention, a method of evaluating the resistivity of earth formations having a borehole passing therethrough comprises the steps of: emitting measurement currents into the formations via an array of azimuthal current electrodes that are circumferentially spaced apart from one another on an elongate body suitable for being displaced along the borehole; emitting focusing currents by annular guard electrodes disposed longitudinally on the body on opposite sides of the array of azimuthal current electrodes; and generating output signals as a function of the measurement currents, the output signals being representative of the resistivity of the formations in a plurality of directions around the borehole. The method further includes the steps of: detecting the potentials that appear on azimuthal monitor electrodes disposed on the body in the vicinity of each of the azimuthal current electrodes; detecting the potentials that appear on two annular monitor electrodes disposed on opposite sides of the array of azimuthal current electrodes; and controlling the emission of the currents in response to the detected potentials to focus said measurement currents longitudinally and azimuthally.

Preferably, the measurement currents are focused by controlling the emission of the currents so as to maintain the potential difference between each azimuthal monitor electrode and the electrically connected annular monitor electrodes at substantially zero. The output signals ($Raz_i$) are generated by determining for each azimuthal current electrode an azimuthal resistivity signal which is a function of the ratio of the potential (vaz) detected on one of the annular monitor electrodes divided by the current ($Iaz_i$) emitted by azimuthal current electrode.

In a preferred embodiment, a high resolution resistivity signal is also generated as a function of the sum of the currents ($Iaz_i$) emitted by the azimuthal current electrodes.

According to another aspect of the invention, an apparatus for evaluating the resistivity of earth formations having a borehole passing therethrough comprises: an elongate body adapted to be moved along the borehole; an array of azimuthal current electrodes circumferentially spaced apart from one another on the body; two annular guard electrodes disposed longitudinally on the body on opposite sides of the array of azimuthal current electrodes; means for emitting measurement currents via the azimuthal current electrodes and focusing currents via the guard electrodes; and means responsive to the measurement currents for generating output signals representative of the resistivity of the formations. Azimuthal monitor electrodes are disposed on the body in the vicinity of respective azimuthal current electrodes and two annular monitor electrodes are disposed on opposite sides of the array of azimuthal electrodes. Means responsive to the potentials on the monitor electrodes control the emission of the currents in such a manner as to focus said measurement currents longitudinally and azimuthally.

Preferably, each azimuthal monitor electrode ($Maz_i$) is surrounded by an azimuthal current electrode ($Aaz_i$).

BRIEF DESCRIPTION OF THE DRAWINGS

The characteristics and advantages of the invention appear more clearly from the following description given by way of non-limiting example and made with reference to the accompanying drawings, in which.

DETAILED DESCRIPTION OF A PREFERRED EMBODIMENT

Figure 1:
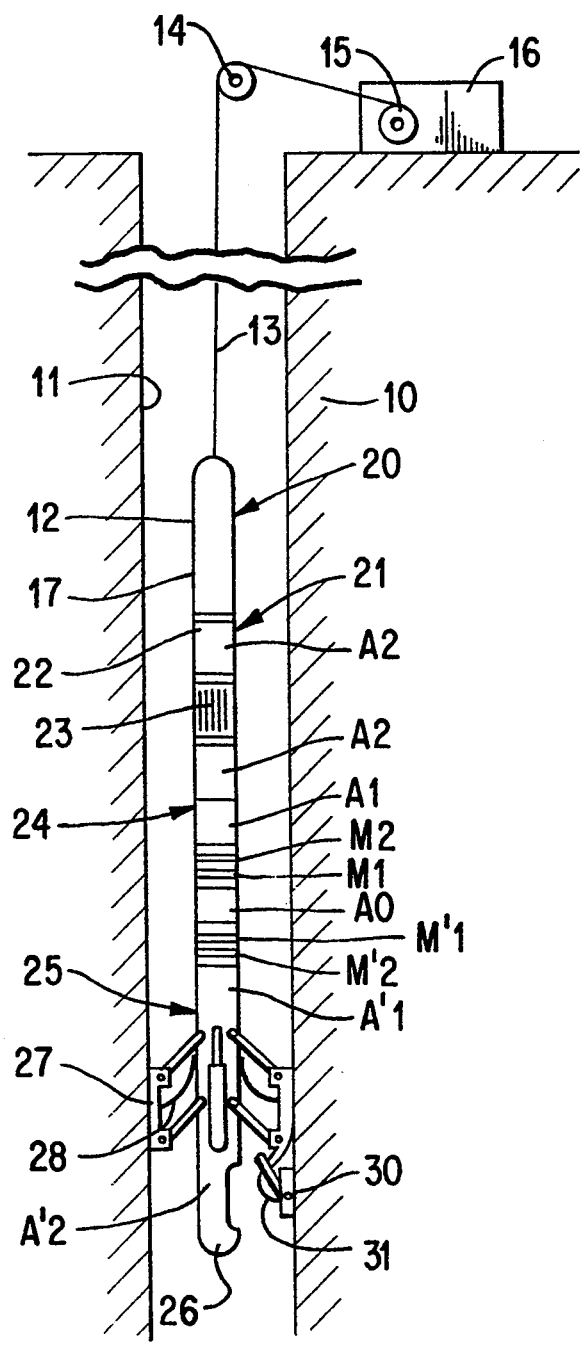
FIG. 1 shows a logging apparatus according to the invention comprising an electrode sonde suspended in a borehole.

With reference to FIG. 1, a logging apparatus for evaluating the resistivity of earth formations 10 having a borehole 11 passing therethrough comprises a sonde 12 suspended in the borehole at the end of a multiconductor cable 13. The cable 13 passes over a sheave 14 and is wound onto a winch 15 for moving the sonde 12 along the borehole. The winch 15 constitutes a portion of a surface unit 16.

The sonde 12 has four sections fixed end to end so as to make up an elongate body 17. The top section 20 is a sealed metal housing containing electrical circuits that are described in greater detail below. A first intermediate section 21 comprises a tubular body 22 which carries an array 23 of azimuthal electrodes that are circumferentially spaced apart from one another. A second intermediate section 24 fixed to the bottom of the first intermediate section 21 carries annular electrodes used for conventional Laterolog type measurements. A bottom section 25 comprises a metal body 26 having four centralizing shoes 27 adapted to bear against the wall of the borehole 11 under drive from leaf springs 28. A measuring shoe 30 hinged to the bottom end of one of the centralizing shoes 27 is urged by an individual spring 31 against the wall of the borehole. This measuring shoe 30 is fitted with conventional electrodes for performing conventional type spherically focused microresistivity measurements.

The sonde 12 includes a first array of annular electrodes for implementing the Dual Laterolog technique described in U.S. Pat. No. 3,772,589 (Scholberg). As described in that patent, the intermediate section 24 carries a central electrode Ao, a first pair of monitor electrodes M1, M'1 connected to each other and disposed on opposite sides of the electrode Ao, a second pair of monitor electrodes M2, M'2 disposed on opposite sides of the pair M1, M'1, and a first pair of guard electrodes A1, A'1 that are connected to each other and are disposed on opposite sides of the pair M2, M'2. The sonde also includes a second pair of guard electrodes A2, A'2 that are connected to each other, with the guard electrode A2 being formed by the body 22 of the intermediate section 21 and with guard electrode A'2 being formed by the body 26 of the bottom section 25.

In the Dual Laterolog technique, the resistivity of the formations at two different radial investigation depths are measured by sending electrical currents at two different frequencies f1 and f2. For the shallow measurement (LLs mode) an alternating measurement current is emitted at a first frequency f1 (e.g. 280 Hz) by the central electrode Ao, said measurement current being focused by an auxiliary current sent between the pair of electrodes A1, A'1 and the pair of electrodes A2, A'2. For further details, reference may be made to the above-mentioned Scholberg patent.

For the deep measurement in LLd mode, an alternating current is used at a low frequency f2 (e.g. 35 Hz) likewise emitted by the electrode Ao. This measurement current is focused by same-frequency auxiliary currents emitted both by the electrodes A1, A'1 and A2, A'2. The auxiliary currents are controlled by a feedback loop circuit that maintains the potential difference between the two pairs of electrodes M1, M'1 and M2, M'2 at substantially zero. The measurement current is thus maintained in a zone which is disk-shaped and perpendicular to the axis of the borehole. This prior technique is used by the apparatus of the invention for obtaining LLd type measurement signals. A portion of the circuits shown in FIGS. 3A and 3B performs the functions required for such LLd mode measurement.

Figure 2:
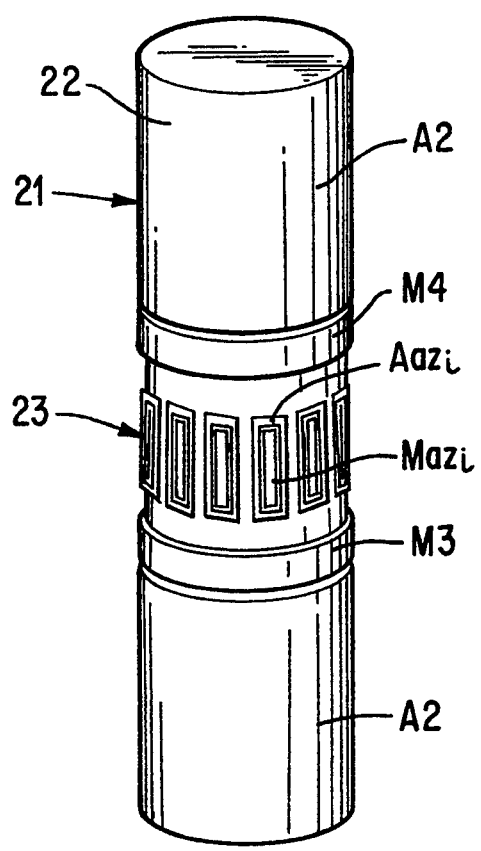
FIG. 2 shows a configuration of azimuthal electrodes used by the FIG. 1 sonde.

In addition to the electrodes enabling it to perform conventional LLd and LLs mode measurements, the apparatus of FIG. 1 includes an array 23 of azimuthal electrodes and other electrodes shown in greater detail in FIG. 2.

FIG. 2 shows the intermediate section 21 of the sonde. The metal tubular body 22 of this section forms an electrode A2 that has a top portion and a bottom portion. Between the two portions of the electrode A2 an isolated central section carries a pair of annular monitor electrodes M3 and M4 that are electrically connected together. Between the two annular electrodes M3 and M4, there is an array 23 of twelve azimuthal current electrodes $Aaz_i$ that are spaced apart circumferentially from one another, where i is an index in the range I to 12. Each of the azimuthal current electrodes is substantially rectangular in shape being elongate in the longitudinal direction, is insulated from the body, and surrounds an azimuthal monitor electrode $Maz_i$. Each azimuthal monitor electrode $Maz_i$ is insulated both relative to the body and relative to the electrode $Aaz_i$ that surrounds it. It too is substantially in the form of a rectangle and it extends over nearly the entire length of the associated current electrode.

In the embodiment described, the annular monitor electrodes M3 and M4 are situated between the portions of the electrode A2 and the array 23 of azimuthal electrodes. These monitor electrodes could also be situated within each portion of the electrode A2 so that the top portion of the electrode A2 extends below the electrode M4 and the bottom portion of the electrode A2 extends above the electrode M3.

To obtain resistivity measurements in a plurality of directions around the borehole, electrical currents are emitted into the formations from the azimuthal current electrodes $Aaz_i$. These currents are focused longitudinally and azimuthally by an active feedback loop system or servo-control system that includes the azimuthal monitor electrodes $Maz_i$, the annular monitor electrodes M3 and M4, and the two portions of the guard electrode A2. For longitudinal focusing, an auxiliary current is emitted by the electrode A2. In addition, the system for servo-controlling the azimuthal measurement currents provides mutual azimuthal focusing between the currents.

It has been found that the passive focusing of prior art devices can be highly disturbed by the differences in electrode contact impedance. In previously described apparatuses where azimuthal electrodes are used, the survey current electrodes and the guard electrodes are maintained at the same potential for focusing the measurement currents. When the electrodes are immersed in the fluid of the borehole, it is observed that the contact impedances of these electrodes can be very different from one another. While current is being emitted, the potential of a current electrode is no longer equal to the potential of the borehole fluid facing it but is at a potential that includes an error which is a function of the product of the emitted current multiplied by the contact impedance. This error in the potential of the current electrode may degrade the focusing of the measurement current. This phenomenon is particularly troublesome with a plurality of measurement currents that are circumferentially directed around the borehole axis.

In the apparatus of FIGS. 1 and 2, emission of the azimuthal measurement currents $Iaz_i$ is so controlled as to maintain the potential difference between each azimuthal monitor electrode $Maz_i$ and the set of electrically interconnected annular monitor electrodes M3, M4 at substantially zero. The azimuthal resistivity measurements are obtained by taking the ratios $Vaz_i/Iaz_i$ of the potential $Vaz_i$ of one of the annular monitor electrodes M3, M4 divided by the azimuthal measurement currents $Iaz_i$. In the general case, each azimuthal resistivity measurement is a function of the ratio of the potential detected on an azimuthal monitor electrode $Maz_i$. divided by the current emitted by the associated azimuthal current electrode $Aaz_i$. In the example described, the potential $Vaz_i$ may be detected on any one of the monitor electrodes $Maz_i$, M3, or M4.

Figure 3A:
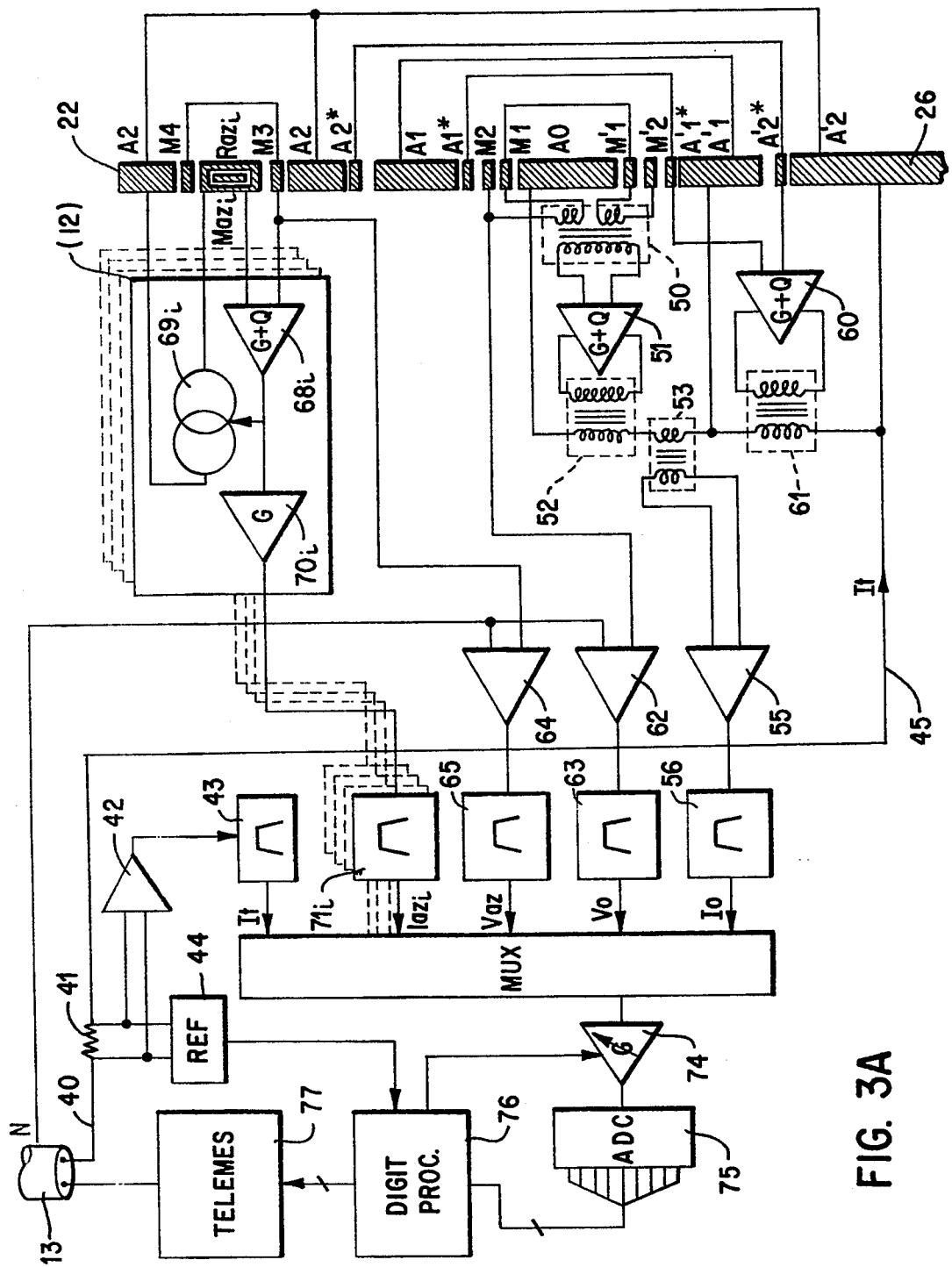
FIGS. 3A and 3B are circuit diagrams respectively of the downhole circuits and the surface circuits in the logging apparatus of FIG. 1.
Figure 3B:
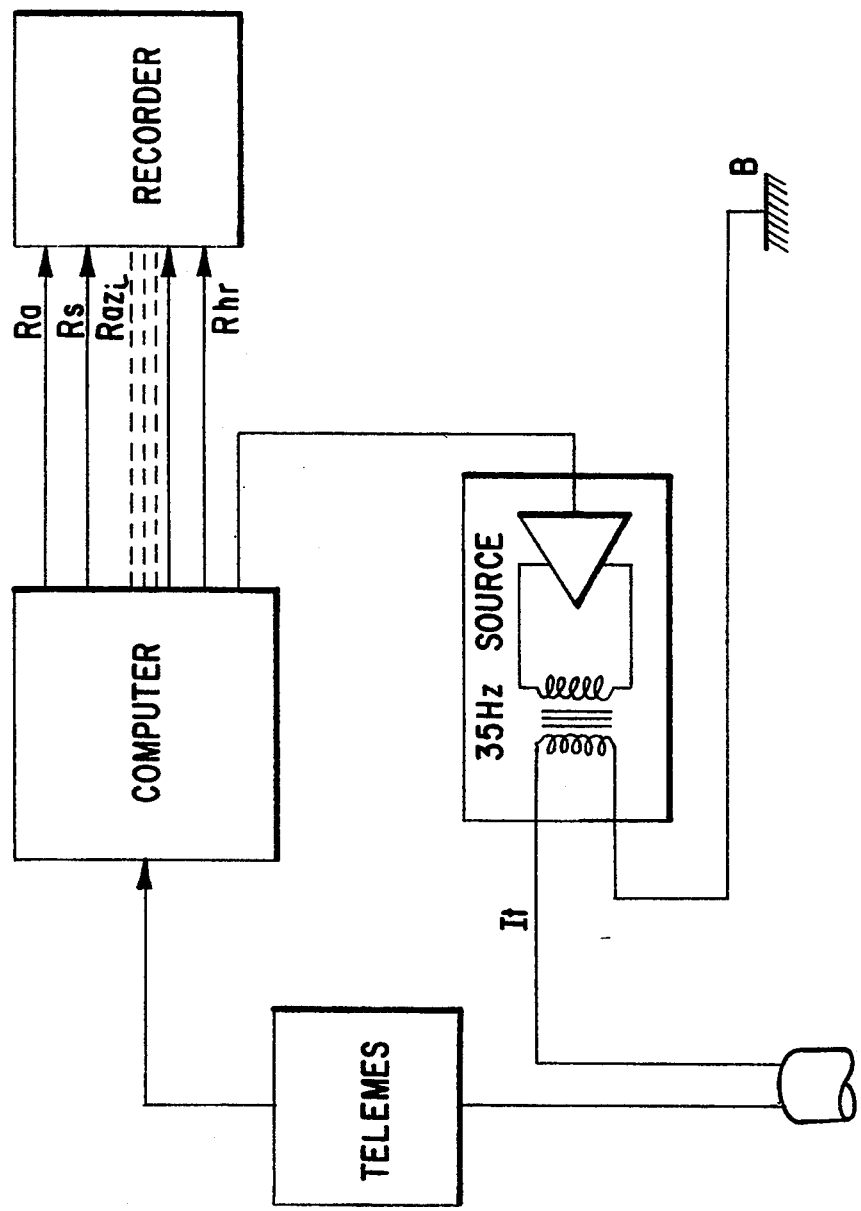

The downhole and the surface circuits of the apparatus are shown diagrammatically in FIGS. 3A and 3B.

With reference to FIG. 3A, the downhole circuits are situated in sections 20 and 21. The above-described electrodes are shown diagrammatically on the right of the figure, with only one electrode $Maz_i$ and only one electrode $Aaz_i$ being shown in order to simplify the description.

An alternating current It at a frequency of 35 Hz is sent by one or more conductors 40 of the cable 13 from the surface to the downhole sonde. This total current It is detected downhole by means of a low resistance series resistor 41 whose terminals are connected to an amplifier 42 followed by a bandpass filter 43 centered on the frequency of 35 Hz. The phase of the total current It is also detected by means of a phase detector circuit 44. Downhole measurement of the total current It and detection of its phase make it possible to ignore any distortion that may have been introduced by transmission along the cable 13. A portion of the total current is applied via a conductor 45 to the electrodes A2 and A'2 that are electrically interconnected by very low resistance copper bars 46. As explained below, the total current flows between the current electrodes and a remote electrode B situated on the surface.

The apparatus includes circuits used for operating in LLs mode with an alternating current at 280 Hz. These circuits are not shown in FIG. 3A in order to simplify the description. The person skilled in the art will have no difficulty in adding such circuits to FIGS. 3A and 3B given the detailed description thereof provided in the above-mentioned Scholberg patent. In conventional manner, these circuits provide a shallow resistivity signal which is recorded on the surface at a function of depth. The present description is therefore limited to describing the circuits that operate in low frequency mode at 35 Hz.

A portion of the circuits shown in FIG. 3A is devoted to conventional LLd mode measurement.

A feedback loop keeps the potential difference between the pairs of monitor electrodes M1, M'1 and M2, M'2 at substantially zero so as to focus the measurement current emitted by the electrode Ao. The monitor electrodes M1 and M2 are connected to a first primary winding of a differential transformer 50, and the monitor electrodes M'1 and M'2 are connected to a second primary winding of the same transformer. The secondary winding of the transformer 50 is connected to the inputs of a broad band filter circuit 51 having high gain amplification and having its output applied to the primary winding of a transformer 52. One end of the secondary winding of the transformer 52 is connected to the electrode Ao and the other end thereof is connected to one of the primary winding of a measurement transformer 53 whose other end is connected to the guard electrodes A1, A'1 which are short-circuited together by a copper bar 54. The secondary of the measurement transformer 53 is connected to an amplifier 55 whose output is applied to a bandpass filter centered on the frequency of 35 Hz. The output of the filter 56 provides an alternating signal representing the current Io emitted by the electrode Ao.

Another feedback loop short circuits the guard electrodes A1, A'1 and A2, A'2 at the frequency of 35 Hz. A pair of interconnected monitor electrodes A1*, A'1* is disposed in the vicinity of the guard electrodes A1, A'1. Another pair of interconnected monitor electrodes is disposed in the vicinity of the guard electrodes A2, A'2. These two pairs of electrodes are connected to the input of a high gain differential amplifier circuit 60 including a filter function at the frequency 35 Hz and having its output applied to the primary winding of a transformer 61. The secondary winding of the transformer 61 is connected between the guard electrode A'1 and the guard electrode A'2.

One of the monitor electrodes M1 or M2, in this case M2, is connected to the input of a measurement amplifier 62 whose other input is connected to the armor of the cable which serves as a remote reference electrode N. The output of the amplifier 62 is applied to a bandpass filter 63 centered on the frequency of 35 Hz and whose output provides an alternating signal corresponding to the potential difference Vo between the electrode M2 and the electrode N.

The above-described circuits perform the functions required for the LLd operating mode as described in the Scholberg patent.

The apparatus shown in FIG. 3A also includes circuits for generating azimuthal resistivity signals. The short-circuited annular monitor electrodes M3 and M4 are connected to the input of a measurement amplifier 64 whose other input is connected to the reference electrode N on the cable armor. The output of the amplifier 64 is applied to a bandpass filter centered on the frequency of 35 Hz which provides an alternating signal $Vaz_i$ representative of the potential difference between the electrodes M3, M4 and the reference electrode N.

Each azimuthal monitor electrode $Maz_i$ is connected to the input of a high gain differential amplifier circuit $68_i$ which also includes a filter function at 35 Hz. The other input of each circuit $68_i$ is connected to the annular monitor electrodes M3, M4 and its output is applied to a current source $69_i$ constituted by a voltage-current converter. The output current from the source $69_i$ is applied between the guard electrode A2 and the azimuthal current electrode $Aaz_i$ corresponding to the monitor electrode $Maz_i$ under consideration. This loop controls each of the azimuthal currents $Iaz_i$ in such a manner as to maintain the potential difference between M3. M4 and the corresponding azimuthal monitor electrode at zero.

The output signal from the circuit $68_i$ is also applied to a measurement amplifier $70_i$ followed by a bandpass filter $71_i$ centered on the frequency of 35 Hz so as to provide an alternating signal $Iaz_i$ representative of the measurement current emitted by the azimuthal electrode $Aaz_i$. As shown in dashed lines in FIG. 3A, the apparatus has twelve identical channels providing the measurement currents $Iaz_i$. The signals Io, Vo, $Vaz_i$, It, and the twelve signals $Iaz_i$ are applied to a multiplexer 73 whose output is applied to a variable gain amplifier 74 and then to an analog-to-digital converter 75. The digital outputs from the converter 75 are applied to a digital processor circuit 76 constituted by a digital signal processor (DSP) programmed to perform a phase sensitive detector (PSD) function and a lowpass filter function. The phase reference required for the detector function comes from the circuit 44 so as to be synchronized with the total downhole current It. The processor circuit 76 also provides a control signal to the variable gain amplifier 74 so as to reduce the dynamic range of the input signals to the analog-to-digital converter 75.

The multiplexed digital signals representing the amplitudes of the currents or voltages Io, Vo, $Vaz_i$, It and $Iaz_i$ are applied to remote measurement circuits 77 for modulating and transmitting the signals to the surface via the cable 13.

As shown in FIG. 3B, the downhole signals are received and demodulated at the surface by a remote measurement circuit 80 and they are then input to a computer 81 which may be a Microvax microcomputer as sold by Digital Equipment Corporation, for example. The computer 81 demultiplexes the signals Io, Vo, $Vaz_i$, It, and $Iaz_i$, and it calculates formation resistivity signals Ra, Rs, $Raz_i$, and Rhr, using the following equations:

$$Ra = k_1 \cdot Vo/Io$$

$$Rs = k_2 \cdot Vo/It$$

$$Raz_i = k_3 \cdot Vaz_i/Iaz_i$$

$$Rhr = k_4 \cdot Vaz_i/\epsilon Iaz_i$$

in which $k_1$, $k_2$, $k_3$, and $k_4$ are predetermined constants that depend on the geometry of the downhole sonde. Ra is the LLd type deep resistivity measurement; Rs is the resistivity measurement of the surrounding formations; $Raz_i$ are twelve azimuthal measurements of resistivity around the borehole; and Rhr which corresponds to a mean of the conductivity $1/Raz_i$ is a measure of formation resistivity having high longitudinal resolution.

These various resistivity signals are recorded as a function of depth in a recording apparatus 82 which may comprise an optical recorder and a magnetic recorder. Prior to recording, the signals $Raz_i$ and Rhr are depth corrected in conventional manner to take account of the fact that they are obtained on the downhole sonde at a different depth from the signals Ra and Rs.

A 35 Hz current source 83 delivers the total current It via one or more conductors of the cable 13 and a return electrode B placed on the surface of the ground. The current It is controlled by means of a variable gain amplifier which receives a control signal from the computer 81. The control signal is designed to minimize the dynamic range of the measurement signals. One example of minimizing is given in the Scholberg patent which maintains the product Vo·Io constant.

The embodiment described above may naturally be varied or improved in numerous ways while remaining within the scope of the invention as defined in the following claims. In particular, the array of azimuthal electrodes may be combined with other logging apparatuses focused by annular electrodes, such as, for example, a Laterolog 3, a Laterolog 9, or a spherical focusing type apparatus.

We claim:

1. A method of evaluating the resistivity of earth formations having a borehole passing therethrough, the method comprising the steps of:

emitting measurement currents into the formations via an array of azimuthal current electrodes circumferentially spaced apart from one another on an elongate body suitable for being displaced along the borehole;

emitting focusing currents by annular guard electrodes disposed longitudinally on the body on opposite sides of said array of azimuthal current electrodes;

detecting the potentials that appear on azimuthal monitor electrodes disposed on the body in the vicinity of each of said azimuthal current electrodes and detecting the potentials that appear on two annular monitor electrodes disposed on opposite sides of said array of azimuthal current electrodes;

controlling the emission of the currents in response to said detected potentials to focus said measurement currents longitudinally and azimuthally;

generating output signals as a function of said measurement currents; and using said output signals to evaluate the resistivity of the formations in a plurality of directions around the borehole.

2. A method according to claim 1, wherein said step of controlling the currents includes the following steps:

detecting potential differences between each of said azimuthal monitor electrodes and said annular monitor electrodes that are connected together; and controlling the currents emitted by each of said azimuthal current electrodes so as to maintain said detected potential differences at substantially zero.

3. A method according to claim 1, wherein said step of generating the output signals comprises generating for each azimuthal current electrode an azimuthal resistivity signal which is a function of the ratio of the potential detected on one of said monitor electrodes divided by the current emitted by said each azimuthal current electrode.

4. A method according to claim 3, further including the step of generating an additional output signal which is a function of the sum of the currents emitted by said azimuthal current electrodes.

5. Apparatus for evaluating the resistivity of earth formations having a borehole passing therethrough, the apparatus comprising:
- an elongate body adapted to be moved along the borehole;
- an array of azimuthal current electrodes circumferentially spaced apart from one another on said body;
- two annular guard electrodes disposed longitudinally on said body on opposite sides of said array of azimuthal current electrodes;
- a plurality of azimuthal monitor electrodes each disposed on said body in the vicinity of a respective azimuthal current electrode;
- two annular monitor electrodes disposed on opposite sides of said array of azimuthal current electrodes;
- means for emitting measurement currents via said current electrodes and focusing current via said guard electrodes;
- means responsive to the potentials on said monitor electrodes to control the emission of said currents longitudinally and azimuthally; and
- means responsive to the measurement currents for generating output signals evaluating the resistivity of the formations.

6. Apparatus according to claim 5, wherein each of said annular monitor electrodes is included in one of said guard electrodes.

7. Apparatus according to claim 5, wherein each of said azimuthal monitor electrodes is surrounded by one azimuthal current electrodes.

8. Apparatus according to claim 7, wherein each of said azimuthal current electrodes is substantially in the form of a rectangle that is elongate in the longitudinal direction.

9. Apparatus according to claim 8, wherein each of said azimuthal monitor electrodes is substantially rectangular in shape and elongate in the longitudinal direction.

10. Apparatus according to claim 5, wherein said array of azimuthal current electrodes comprises twelve azimuthal current electrodes that are uniformly spaced apart around the periphery of the body.

11. Apparatus according to claim 5, further comprising means for generating a mean output signal as a function of the sum of said measurement currents.

12. Apparatus for evaluating the resistivity of earth formations having a borehole passing therethrough, the apparatus comprising:
- an elongate body adapted to be moved along the borehole;
- an array of azimuthal current electrodes circumferentially spaced apart from one another on said body;
- two annular guard electrodes disposed longitudinally on said body on opposite sides of said array of azimuthal current electrodes;
- a plurality of azimuthal monitor electrodes each disposed on said body in the vicinity of a respective azimuthal current electrode;
- two electrically connected annular monitor electrodes disposed on opposite sides of said array of azimuthal current electrodes;
- means for emitting measurement currents via said current electrodes and focusing current via said guard electrodes;
- means for detecting the potential differences between each of said azimuthal monitor electrodes and said annular monitor electrodes;
- means for controlling the emission of said measurement currents in such a manner as to maintain said detected potential differences at subtantially zero; and
- means responsive to the measurement currents for generating output signals evaluating the resistivity of the formations.

13. Apparatus according to claim 12, wherein said means for generating output signals comprises:
- means for detecting the potential difference between one of said monitor electrodes and a reference electrode;
- means for detecting the measurement currents emitted by each of said azimuthal current electrodes; and
- means for generating azimuthal resistivity signals each of which is a function of the ratio of said detected potential difference to said detected measurement current emitted by said each azimuthal current electrodes.

14. Apparatus according to claim 13, further comprising means for generating a mean output signal as a function of the sum of said detected measurement currents.

* * * * *